US009539652B2

(12) United States Patent
Sampath et al.

(10) Patent No.: US 9,539,652 B2
(45) Date of Patent: Jan. 10, 2017

(54) ROTARY CUTTING TOOL HAVING PCD CUTTING TIP

(75) Inventors: Karthik Sampath, Pittsburgh, PA (US); Armin Zimmerman, Oberviechtach (DE); Steve George, Greensboro, NC (US)

(73) Assignee: KENNAMETAL INC., Latrobe, PA (US)

( * ) Notice: Subject to any disclaimer, the term of this patent is extended or adjusted under 35 U.S.C. 154(b) by 736 days.

(21) Appl. No.: 12/907,397

(22) Filed: Oct. 19, 2010

(65) Prior Publication Data

US 2011/0268518 A1 Nov. 3, 2011

Related U.S. Application Data

(60) Provisional application No. 61/329,707, filed on Apr. 30, 2010.

(51) Int. Cl.
*B23B 51/02* (2006.01)
*B23B 51/06* (2006.01)

(52) U.S. Cl.
CPC .............. *B23B 51/02* (2013.01); *B23B 51/06* (2013.01); *B23B 2222/88* (2013.01); *B23B 2226/275* (2013.01); *B23B 2226/315* (2013.01); *B23B 2240/08* (2013.01); *B23B 2251/18* (2013.01); *B23B 2251/408* (2013.01); *Y10T 408/455* (2015.01); *Y10T 408/81* (2015.01); *Y10T 408/906* (2015.01); *Y10T 408/9097* (2015.01)

(58) Field of Classification Search
CPC . B32B 51/02; B32B 2226/315; B32B 2251/18
USPC ................. 408/59, 223, 224, 225, 145, 230
See application file for complete search history.

(56) References Cited

U.S. PATENT DOCUMENTS

| 748,890 | A | | 1/1904 | Frederick | |
|---|---|---|---|---|---|
| 2,600,286 | A | * | 6/1952 | Weiland | 408/211 |
| 2,613,710 | A | * | 10/1952 | Emmons | 408/213 |
| 2,652,083 | A | * | 9/1953 | Emmons | 408/211 |
| 2,891,429 | A | | 6/1959 | Tragge | |
| 3,040,605 | A | | 6/1962 | Andreasson | |
| 3,076,357 | A | | 2/1963 | Benjamin | |
| 3,387,511 | A | * | 6/1968 | Ackart, Sr. et al. | 408/230 |
| 4,060,335 | A | | 11/1977 | Holloway | |
| 4,115,024 | A | | 9/1978 | Sussmuth | |
| 4,230,429 | A | | 10/1980 | Eckle | |

(Continued)

FOREIGN PATENT DOCUMENTS

| CN | 101282806 A | 10/2008 |
|---|---|---|
| DE | 2512854 A1 | 10/1975 |

(Continued)

OTHER PUBLICATIONS

Blackmore, Ian, Examiner, United Kingdom Intellectual Property Office, Search Report, Aug. 30, 2011, 3 pp.

(Continued)

*Primary Examiner* — Eric A Gates
(74) *Attorney, Agent, or Firm* — Ian K. Samways

(57) ABSTRACT

A rotary cutting tool comprises an elongate body disposed about a longitudinal axis, the elongate body including a helical flute and a polycrystalline-diamond cutting tip. The cutting tip comprises an inner portion having an inner point angle and an outer portion having an outer point angle different from the inner point angle.

28 Claims, 5 Drawing Sheets

(56) References Cited

U.S. PATENT DOCUMENTS

| | | | |
|---|---|---|---|
| 4,248,555 A | 2/1981 | Satou | |
| 4,303,358 A | 12/1981 | Grusa | |
| 4,340,327 A | 7/1982 | Martins | |
| 4,355,932 A | 10/1982 | Koppelmann | |
| 4,480,952 A | 11/1984 | Jeremias | |
| 4,687,387 A | 8/1987 | Roos | |
| 4,704,055 A | 11/1987 | Guehring | |
| 4,728,231 A * | 3/1988 | Kunimori et al. | 408/59 |
| 4,878,788 A * | 11/1989 | Wakihira et al. | 408/230 |
| 5,217,332 A | 6/1993 | Takasaki et al. | |
| 5,273,380 A | 12/1993 | Musacchia | |
| 5,425,604 A | 6/1995 | Scheer | |
| 5,443,337 A | 8/1995 | Katayama | |
| 5,458,210 A | 10/1995 | Sollami | |
| 5,487,627 A | 1/1996 | Kasutani et al. | |
| 5,580,196 A * | 12/1996 | Thompson | 408/145 |
| 5,700,113 A * | 12/1997 | Stone et al. | 408/1 R |
| 5,735,648 A | 4/1998 | Kleine | |
| 5,788,431 A | 8/1998 | Basteck | |
| 5,865,574 A * | 2/1999 | Tukala | 408/57 |
| 5,909,985 A | 6/1999 | Shiga | |
| 5,947,660 A * | 9/1999 | Karlsson et al. | 408/230 |
| 5,980,166 A * | 11/1999 | Ogura | 408/57 |
| 6,044,919 A | 4/2000 | Briese | |
| 6,095,725 A | 8/2000 | Stahl | |
| 6,102,634 A * | 8/2000 | Turner et al. | 408/224 |
| 6,113,321 A * | 9/2000 | Mulroy et al. | 408/211 |
| 6,132,148 A * | 10/2000 | Thompson | 408/144 |
| 6,224,302 B1 | 5/2001 | Cole | |
| 6,443,674 B1 * | 9/2002 | Jaconi | 408/1 R |
| 6,511,265 B1 | 1/2003 | Mirchandani | |
| 6,551,035 B1 * | 4/2003 | Bruhn et al. | 408/144 |
| 6,601,659 B2 | 8/2003 | Saitta | |
| 6,629,805 B1 * | 10/2003 | Eischeid | 408/228 |
| 6,655,882 B2 | 12/2003 | Heinrich | |
| 6,676,342 B2 * | 1/2004 | Mast et al. | 408/144 |
| 6,857,832 B2 * | 2/2005 | Nygård | 408/211 |
| 6,929,434 B2 * | 8/2005 | Prokop | 408/230 |
| 6,988,859 B2 | 1/2006 | Borschert et al. | |
| 7,108,460 B2 | 9/2006 | Chang | |
| 7,140,815 B2 * | 11/2006 | George et al. | 408/230 |
| 7,147,414 B2 | 12/2006 | Mast et al. | |
| 7,241,089 B2 | 7/2007 | Mast | |
| 7,244,081 B2 | 7/2007 | Johnson | |
| 7,267,513 B2 | 9/2007 | Wiker | |
| 7,306,410 B2 | 12/2007 | Borschert | |
| 7,476,067 B2 * | 1/2009 | Borschert et al. | 408/59 |
| 7,575,401 B1 | 8/2009 | Garrick et al. | |
| 7,832,966 B2 * | 11/2010 | Shultz et al. | 408/224 |
| 7,861,807 B2 * | 1/2011 | Probst et al. | 175/420 |
| 2003/0129031 A1 | 7/2003 | Mast et al. | |
| 2003/0133763 A1 | 7/2003 | Kuroda | |
| 2003/0138305 A1 * | 7/2003 | Pedersen | 408/230 |
| 2004/0124016 A1 | 7/2004 | Nuzzi | |
| 2005/0053439 A1 * | 3/2005 | Wang et al. | 408/230 |
| 2005/0103532 A1 * | 5/2005 | Magin | 175/415 |
| 2005/0274551 A1 * | 12/2005 | Batliner et al. | 175/414 |
| 2006/0171787 A1 | 8/2006 | Lindblom | |
| 2007/0042217 A1 | 2/2007 | Fang | |
| 2007/0160437 A1 | 7/2007 | Shultz et al. | |
| 2009/0028654 A1 * | 1/2009 | Turrini | 408/1 R |
| 2009/0087275 A1 | 4/2009 | Goulbourne | |
| 2009/0279965 A1 * | 11/2009 | Soittu | 408/59 |
| 2010/0202845 A1 | 8/2010 | Fang | |
| 2010/0260566 A1 * | 10/2010 | Glimpel et al. | 408/222 |
| 2011/0081215 A1 * | 4/2011 | Nakamura et al. | 408/230 |

FOREIGN PATENT DOCUMENTS

| | | | | |
|---|---|---|---|---|
| DE | 202005020931 U1 | 1/2007 | | |
| DE | 102008052743 A1 | 4/2010 | | |
| EP | 123878 | 11/1984 | | |
| EP | 353214 | 1/1990 | | |
| EP | 1280625 | 10/2007 | | |
| FR | 2654663 A1 * | 5/1991 | | B23P 15/28 |
| FR | 2779366 A1 * | 12/1999 | | B23B 51/02 |
| FR | 2878772 | 6/2006 | | |
| GB | 2259263 A | 3/1993 | | |
| GB | 2 428 611 A | 2/2007 | | |
| WO | 9212817 | 8/1992 | | |
| WO | 01/91960 A1 | 12/2001 | | |
| WO | 2008098636 | 8/2008 | | |

OTHER PUBLICATIONS

Feb. 10, 2014—OA.
Jan. 30, 2014—Search_Report.
Office Action dated Aug. 4, 2014 with China Search Report.
Preliminary Search Report dated Jun. 23, 2014.
Examination Report dated Jun. 25, 2014.
Davis, J.R., Tool Materials, ASM Specialty Handbook, ASM International, 1995, pp. 85-93.
Office Action Oct. 13, 2015.
Apr. 14, 2015 Second Office Action CN102451930A.

* cited by examiner

ROTARY CUTTING TOOL HAVING PCD CUTTING TIP

CLAIM TO PRIORITY

This application claims priority to U.S. provisional application No. 61/329,707 filed Apr. 30, 2010, entitled "PCD Drill for Composite Materials", the contents of which are incorporated herein by reference.

BACKGROUND

Field of the Invention

The invention relates generally to rotary cutting tools and, more particularly, to rotary cutting tools, such as drills, having polycrystalline-diamond (PCD) cutting tips. The invention further relates to a method for forming a rotary cutting tool having a polycrystalline-diamond cutting tip.

Background Information

Polycrystalline-diamond (PCD) drills have historically been formed as straight fluted, facet point drills. More recently, PCD drills have been formed having helical flutes and more complex point geometries similar to solid carbide drills. One of the major uses of such highly engineered PCD drills is for drilling in composite materials, such as carbon fiber reinforced polymer (CFRP) titanium composites. Drills used for cutting such material require a high wear resistance to survive in CFRP while having a geometry that is effective to cut titanium. Aerospace customers, who commonly utilize such CFRP composite materials, further require that the burr height of the titanium portion of the drilled composite material be maintained around 100 microns. Known PCD drills produce a high quality hole in the first few holes, but rapidly begin to produce unacceptable burrs soon thereafter (typically about 5 holes or less). Accordingly, such drills must be replaced frequently at a high cost.

There is, therefore, room for improvement in rotary cutting tools used for drilling CFRP-titanium, particularly in the quality of the holes cut and the durability of the cutting tool.

SUMMARY OF THE INVENTION

Deficiencies in the prior art are addressed by embodiments of the invention which are directed to a rotary cutting tool, a polycrystalline-diamond cutting tip for use with a rotary cutting tool, and a method for forming a rotary cutting tool having a polycrystalline cutting tip.

As one aspect of the invention, a rotary cutting tool is provided. The rotary cutting tool comprises: an elongate body disposed about a longitudinal axis. The body includes a helical flute and a polycrystalline diamond cutting tip. The cutting tip comprises: an inner portion having an inner point angle; and an outer portion having an outer point angle different from the inner point angle.

The outer point angle may be greater than the inner point angle. The inner point angle may be in the range of about 110 degrees to about 140 degrees. The outer point angle may be in the range of about 145 degrees to about 180 degrees. The elongate body may be formed from a carbide material. The elongate body may comprise: a first end opposite the cutting tip; and at least two coolant passages passing therethrough, each coolant passage extending from the first end to the cutting tip. Each coolant passage may be generally helical in shape.

As another aspect of the invention, a polycrystalline diamond cutting tip for use with a rotary cutting tool is provided. The cutting tip comprises: an inner portion having an inner point angle and an outer portion having an outer point angle different from the inner point angle.

The outer point angle may be greater than the inner point angle. The inner point angle may be in the range of about 110 degrees to about 140 degrees. The outer point angle may be in the range of about 145 degrees to about 180 degrees.

As a further aspect of the invention, a method for forming a rotary cutting tool having a polycrystalline-diamond cutting tip is provided. The method comprises: forming at least two coolant passages in a generally cylindrical tool body; forming at least two coolant passages in a tip portion, the tip portion being separate from the tool body; and coupling the tip portion to the tool body to form the rotary cutting tool.

The tip portion may be coupled to the tool body via a brazing process. The at least two coolant passages may be formed in the generally cylindrical tool body by an extrusion process. The at least two passages may be formed in the tip portion via an EDM drilling process.

BRIEF DESCRIPTION OF THE DRAWINGS

A full understanding of the invention can be gained from the following description of the preferred embodiments when read in conjunction with the accompanying drawings in which:

FIG. 6 is a side view of the drill illustrated in FIG. 3 taken along arrows "6-6" in FIG. 3.

DESCRIPTION OF THE PREFERRED EMBODIMENTS

Figure 1:
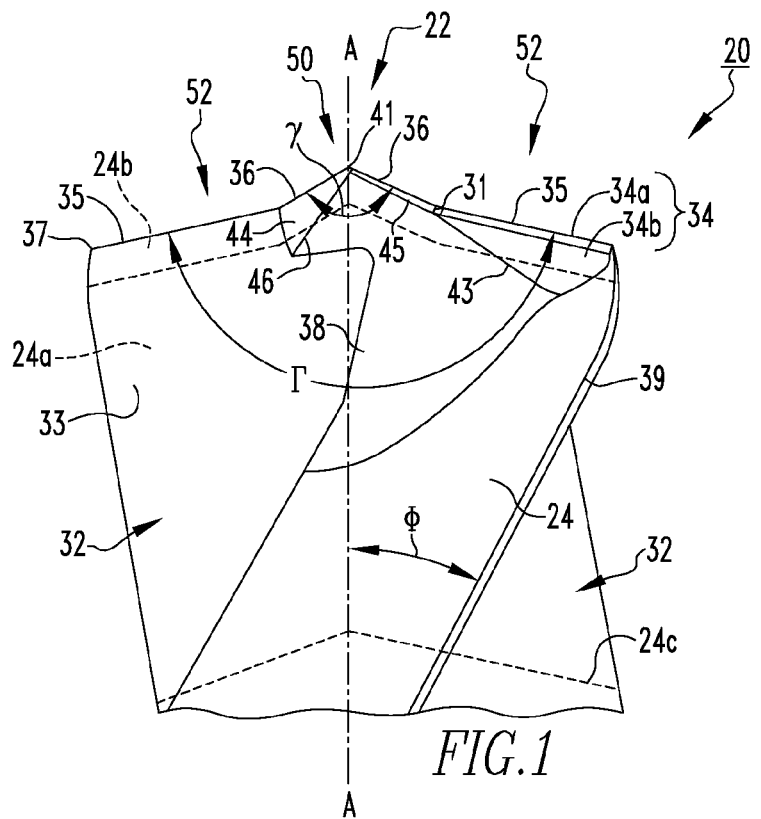
FIG. 1 is a side view taken along a line generally perpendicular and within the same horizontal plane as the primary cutting edge and second cutting edge portions of the cutting end of a helical drill in accordance with a non-limiting embodiment of the present invention.

Directional phrases used herein, such as, for example, left, right, front, back, top, bottom and derivatives thereof, relate to the orientation of the elements shown in the drawings and are not limiting upon the claims unless expressly recited therein. Identical parts are provided with the same reference number in all drawings.

Figure 2:
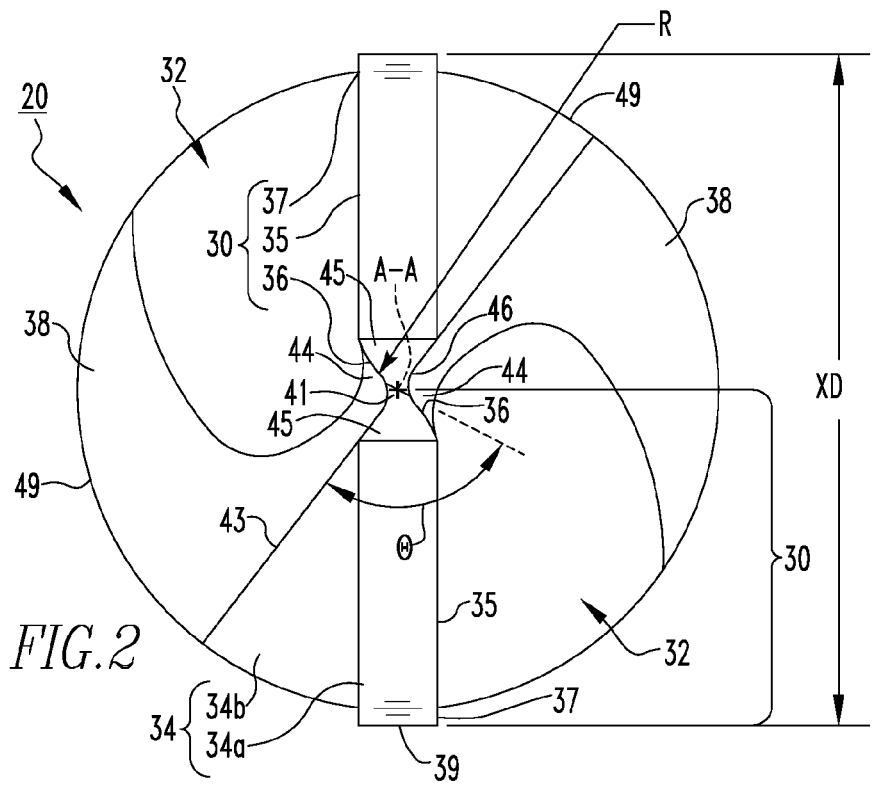
FIG. 2 is a top view of the cutting end of the drill shown in FIG. 1.

FIGS. 1 and 2 show a portion of an example helical drill 20 in accordance with a non-limiting embodiment of the present invention. Drill 20 is configured to be rotationally driven about a center longitudinal axis A-A or to have an associated workpiece (not shown) rotate, or both the drill 20 and workpiece rotate relative to each other. Referring to FIG. 1, drill 20 is arranged such that a cutting end 22 is formed at the outer end of a shank 24. Shank 24 comprises a first portion 24a preferably formed of carbide material and a second portion 24b preferably formed of PCD material disposed at or about the cutting end 22. Carbon fibers contained in composite materials are highly abrasive and a PCD tool material helps to prolong the life and edge sharpness of the drill 20. A sharp edge is critical to minimize unwanted damage to the machined composite material and further to minimize burr height when the drill 20 exits the metal of a CFRP-titanium composite. A blunt edge generally causes excessive delamination in CFRP and likewise is unfavorable when cutting titanium, leading to higher stresses and temperatures, eventually resulting in premature chipping of the drill, and damage to the workpiece.

In the example embodiment shown in FIGS. 1 and 2, shank 24 is formed by first sintering the PCD material onto a small piece of carbide which is then brazed onto a larger piece of carbide, such as at braze line 24c, shown in dashed line in FIG. 1. However, it is to be appreciated that other methods or steps may be employed in forming shank 24 without varying from the scope of the present invention.

Continuing to refer to FIGS. 1 and 2, shank portion 24 includes two chip discharge flutes 32. The flutes 32 are formed from the tip of the cutting end 22 and extend rearward to adjacent a fastening shank portion (not shown) of the drill 20 that is adapted to be mounted in a machine tool, as commonly known in the art. The flutes 32 are generally symmetric and at equal intervals in the circumferential and axial direction and are disposed in a generally helical path oriented at a helix angle φ (FIG. 1) with respect to longitudinal axis A-A. The flutes 32 ensure that composite fibers of the workpiece are cut well while minimizing delamination as the drill 20 enters the workpiece. The helix angle φ of the flutes also plays an important role in the hole cutting process. A low helix angle φ or a straight flute would not evacuate the metallic chips effectively, while a high helix angle φ would reduce the strength of the cutting edge. A preferred helix angle also enables appropriate curl of the cut chips. In at least one embodiment of the present invention such preferred helix angle φ was found to be about 22.5 degrees. Generally such helix angle φ was found to be in the range of about 18 degrees to about 30 degrees. It is to be appreciated that a differential helix could also be employed. In such embodiments, the local helix angle near the cutting edge is preferably within the given range, but the helix angle toward the shank may vary within or outside the range.

Cutting end 22 includes a pair of cutting edges 30 (FIG. 2) formed along the intersecting ridge where forward flute wall surfaces 33 (FIG. 1) intersect with a top flank 34. Each top flank 34 includes forward surface sections 34a and rearward surface sections 34b on opposing sides of the drill 20. Each cutting edge 30 has at least a first cutting edge portion 36 and a second cutting edge portion 35, with the first cutting edge portion 36 extending radially from a central generally straight chisel edge 41 to the second cutting edge portion 35, and the second cutting edge portion 35 extending radially outward to at least approximately near an outer margin 39 on the external radial circumference of the drill 20. The chisel edge 41 is formed by intersecting peak surfaces 45. The second cutting edge portion 35 extends radially outward to a third outer cutting edge portion 37. The third outer cutting edge portion 37 extends radially outward from the second straight portion 35 to the drill margin 39 and axially rearward. The length of the chisel edge 41 in comparison to the diameter of the drill is designed to be approximately between 1%-10% of the drill's diameter.

The above described symmetric design of the cutting edges 30 greatly facilitates stability in use of the drilling system. This characteristic is achieved by the neutral or balanced geometry of the cutting surfaces, which significantly decrease any tendency of the drilling system to wobble in use. However, it is to be appreciated that cutting edges 30 as well as other elements described herein as being symmetric in the example embodiments may also be asymmetric without varying from the scope of the present invention.

The forward sections 34a of top flank 34 immediately adjacent all portions of the cutting edge 30 are oriented at a first relief angle generally between 5 degrees and 20 degrees, or about 10 degrees. Rearward sections 34b of top flank 34 are oriented at a greater second relief angle than the forward sections 34a. Rearward surface sections 34b are oriented at a second relief angle generally between 15 degrees to 50 degrees, 25 degrees to 40 degrees, or at about 20 degrees. In the embodiment illustrated in FIGS. 1 and 2, the first cutting edge portion 36 is convex and has a generally constant radius of curvature R when taken from a top view along the central axis, as seen in FIG. 2. The radius of curvature R is generally set to the range of from 8% of the external diameter of the drill, XD, to 20% of the external diameter XD when viewed from a top view taken along the central axis of the drill, as shown in FIG. 2. The radius of curvature R generally eliminates the sharp transition between cutting edges 30, so that breakage of the cutting edges 30 can be prevented regardless of drilling conditions. It is contemplated that the first cutting edge portion 36 may also be other convex curvilinear geometries rather than a convex shape having a generally constant radius. It is also contemplated that the first cutting edge portion 36 could also be formed in other non-curvilinear shapes (e.g., without limitation, chamfers) without varying from the scope of the present invention.

The drill 20 is preferably shaped by thinning at the cutting end of the drill 20. The thinning is applied to a thick central core portion at the tip of the drill main body and a curvilinear first cutting edge portion 36 is formed by the thinning, the first cutting edge portion 36 extends from the central chisel edge 41 to the second cutting edge portion 35. It is to be appreciated that in the embodiment shown in FIGS. 1 and 2, the first cutting edge portion 36 does not stretch to the center of the drill 20. The first portion 36 of the cutting edge is formed at a position slightly spaced apart from the central axis of the drill to reduce weakening of the center of the drill caused by stress concentration.

The thinning surfaces on the drill tip 22 of the present invention shown in FIGS. 1 and 2 reach from the central core of the drill 20 to the sidewall 49 of the drill 20. The first thinning surface 38 extends from the rear side of the chip discharge flute 32 to the rearward surface 34b of top flank 34, when viewed from a top view taken along the central axis A-A of the drill 20 (as shown in FIG. 2). In the embodiment of the invention illustrated in FIGS. 1 and 2, the thinning surface 38 is disposed to stretch from the external circumferential sidewall 49 to the central core of the drill 20 near the central axis A-A.

Each thinning on opposite sides of the central axis A-A is composed of two thinning surfaces, first thinning surface 38 and second thinning surface 44. As seen in FIG. 1, the second thinning surface 44 runs basically parallel to the central axis A-A of the drill 20. It is contemplated, in an alternative embodiment of the invention, that the second thinning surface 44 may be slightly angled forward or rearward with respect to the cutting direction of the drill 20 to provide a negative or positive rake. The first cutting edge portion 36 is formed along the intersecting ridge where the second thinning surface 44 intersects with the peak surface 45. The first thinning surface 44 extends generally downward to a crease 46 formed with second thinning surface 38. The first thinning surface 44 is preferably not a flat plane but instead a convex surface, as best represented by line 36 in FIG. 2 (note, line 36 represents the cutting edge portion formed where the first thinning surface 44 intersects with the peak surfaces 45).

The second thinning surface 38 generally is flat and planar and oriented at a constant rearward angle with respect to a plane intersecting the central axis A-A of the drill 20. In one embodiment of the invention, the plane interesting the longitudinal axis A-A is also parallel to the second cutting edge portion 35, although this central axis intersecting plane need not be parallel to the second cutting edge portions 35. The rearward angle is generally between 30 and 50 degrees, alternatively, between 40 degrees to 45 degrees, or may be about 45 degrees. It should be appreciated that the second thinning surface 38 may be shaped other than flat and planar without varying from the scope of the present invention.

A flank edge 43 represents an upper boundary of the thinning. The flank edge 43 is defined as the intersection between the second thinning surface 38 and the top flank rearward surface section 34$b$. The flank edge 43 is oriented at an angle θ with respect to the chisel edge 41 (see FIG. 2). The angle θ is generally set between the range of from 75 degrees to 105 degrees, or within the range 85 degrees to 95 degrees or at about 90 degrees (as shown).

An upwardly inclined peak surface 45 is associated with each of the top flank surfaces 34$a$, 34$a$ and cutting edges 30, 30. As shown in FIG. 1, the first cutting edge portions 36 associated with peak surfaces 45 are generally oriented to form an inner point angle γ, which represents the angle of the peak surface 45 and associated first cutting edge portions 36. In the example embodiment shown, cutting edge 30 on one side of the rotational axis A-A is symmetric with the cutting edge 30 on the opposite side of the rotational axis A-A. However it is to be appreciated that the cutting edges 30 could also be asymmetric without varying from the scope of the present invention. In the embodiment shown in FIGS. 1 and 2, the peak surfaces 45 are oriented generally at the same angle (not numbered) with respect to the rotational axis A-A. The inner point angle γ is preferably within the range of about 110 degrees to about 140 degrees.

The inner point angle γ generally defines an inner point 50 near the central portion of the drill 20. Such inner point 50 generally provides improved stability and enables good centering of the drill 20 as it enters a workpiece (not shown). By decreasing the inner point angle γ of the inner point 50, thus making inner point 50 steeper, the start up, stability and reduction in wobbling of the drill may be improved as desired by configuring the angle γ as required for various applications. However, it is to be appreciated that while decreasing the angle γ generally improves the start up, stability and wobble reduction of the drill, such decreasing also generally weakens the peaked tip of the drill 20.

Continuing to refer to FIG. 1, the second cutting edge portions 35 are generally oriented to form an outer point angle Γ. Preferably, the angle Γ is within the range of about 145 degrees to about 180 degrees. The outer point angle Γ generally defines a peripheral, or outer point geometry (hereinafter referred to as outer point 52). The relatively flat geometry of outer point 52 ensures that cutting forces are directed generally axially along the drill 20 rather than laterally, and hence decreases the size of the burr that rolls off along the exit edge of a drilled hole.

The third outer cutting edge portion 37 may be curvilinear and have a constant radius of rotation or may instead be chamfered. It is also contemplated that other embodiments of the drill might not have a third outer cutting edge portion 37, but may consist of only a first cutting edge portion 36 and a second cutting edge portion 35 that extends radially outward from the first cutting edge portion 36 to the extreme margin of the drill forming a sharp corner thereat.

With respect to FIGS. 3-9, wherein a second non-limiting embodiment of the present invention is depicted, it should be appreciated that like parts of the previously discussed drill will retain the same reference item numbers and these parts will not again be discussed at length.

Figure 3:
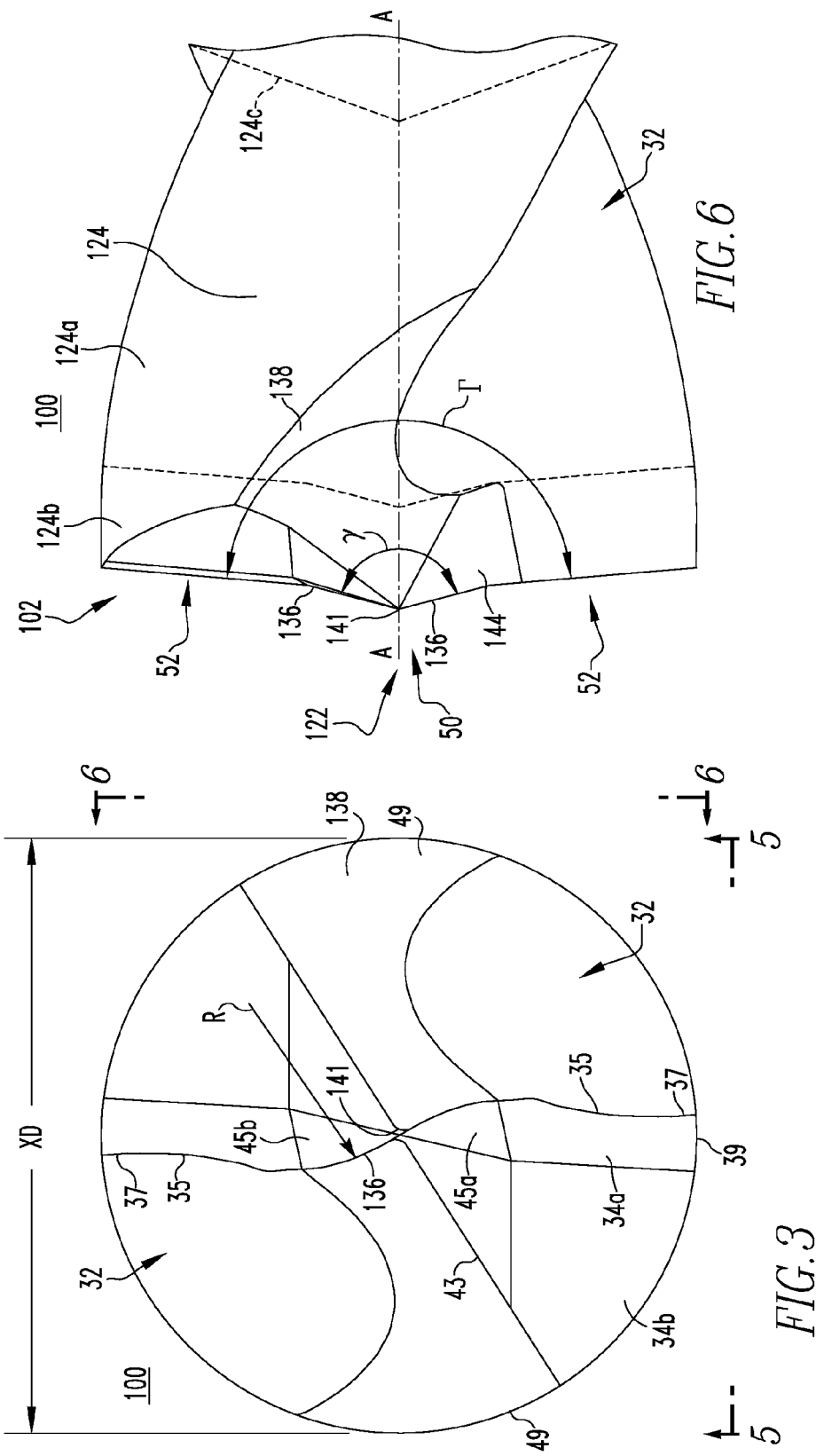
FIG. 3 is a top view of the cutting end of a drill in accordance with another non-limiting embodiment of the present invention.

Of particular note, FIG. 3 is a view similar to that of previously presented FIG. 2, but the chisel edge 141 is much shorter relative to the tool external diameter than the chisel edge 41 previously discussed. The enlarged view of FIG. 3 found in FIG. 4 highlights this feature. Additionally, as will be discussed, the first curvilinear cutting edge portion 136 has a positive axial rake angle.

Figure 4:
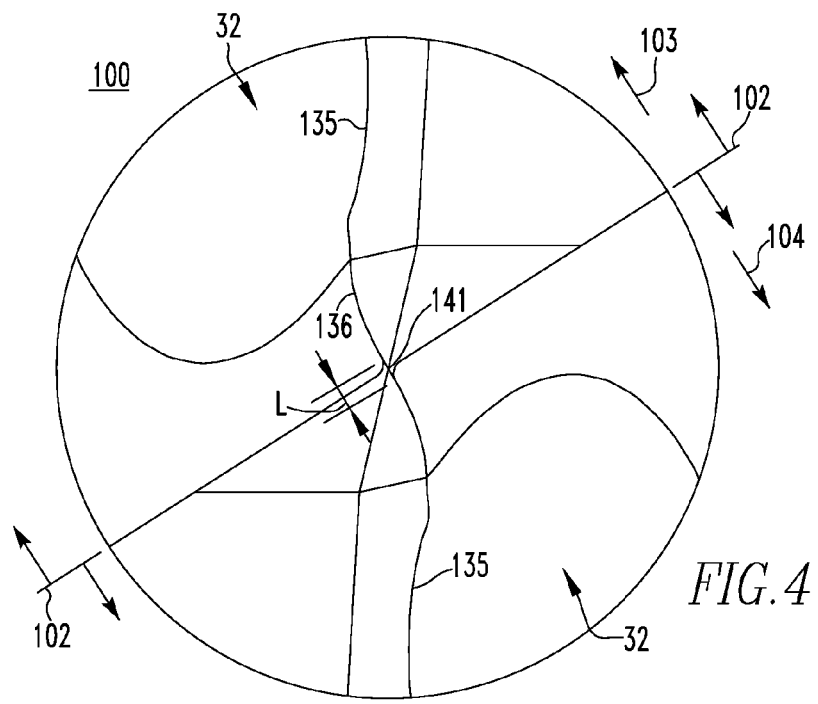
FIG. 4 is an enlarged view of the top view illustrated in FIG. 3.
Figure 5:
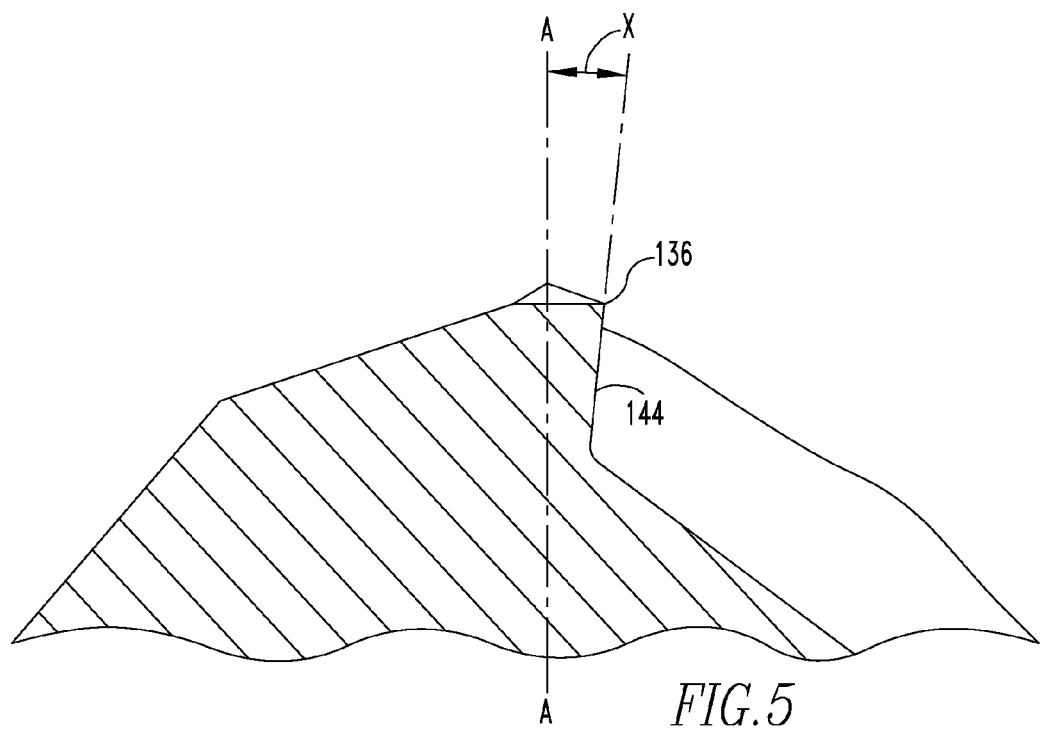
FIG. 5 is a partial cross-sectional view taken along arrows "5-5" in FIG. 3.

Referring to FIGS. 3-6, the drill 100 has a longitudinal axis A-A (FIG. 6) which in the end view of FIG. 4 is the center of the drill 100. As shown in FIG. 6, drill 100, like drill 20 previously described, includes a shank 124 having a first portion 124$a$ preferably formed of carbide material and a second portion 124$b$ preferably formed of PCD material disposed at or about a cutting end 122. In a preferred embodiment, shank 124 is formed by first sintering the PCD material onto a small piece of carbide which is then brazed onto a larger piece of carbide, such as shown by dashed braze line 124$c$. However, it is to be appreciated that other methods or steps may be employed in forming shank 124 without varying from the scope of the present invention.

A first peak surface 45$a$ and a second peak surface 45$b$, intersect at, and are generally adjacent to, the central axis A-A and intersect to form the chisel edge 141. An imaginary bisector line 102 extends radially through the central axis A-A perpendicular to the chisel edge 141 and defines a first tool half 103 on one side of the bisector line 102 and a second half 104 on the other side of the bisector line 102.

Each tool half 103,104 has a first curvilinear cutting edge portion 136 extending radially from the chisel edge 141 and a second cutting edge portion 135 extending radially outwardly from the first cutting edge portion 136. When viewed from the cutting end 122 (FIG. 6) the chisel edge 141 is curved to blend with the first curvilinear cutting edge 136 of the first tool half 103 and the first curvilinear cutting edge 136 of the second tool half 104. It should be appreciated when viewing FIG. 4 that the chisel edge 141 blends smoothly with the first curvilinear cutting edge 136 of the first tool half 103 and the first curvilinear cutting edge 136 of the second tool half 104 to provide a continuous "s" shaped connector between each of the first curvilinear cutting edges.

Of particular interest in the subject invention is the fact that the first curvilinear cutting edge portions 136 adjacent to the chisel edge 141 of each tool half 103,104 each have adjacent surfaces which define a positive axial rake angle. In particular, the second thinning surface 144 (FIG. 6) serves as the rake face for the first curvilinear cutting portion 136. It should be appreciated that the positive axial rake angle X (FIG. 5) between the second thinning surface 144 and the central axis A-A may be generally between 0 and 15 degrees and preferably is about 5 degrees.

Additionally, the length L (FIG. 4) of the chisel edge 141 is short relative to the external diameter XD (FIG. 3) of the drill 100. In particular, the length L of the chisel edge 141 is generally between about 1% and 4%, preferably about 2.5%, of the external diameter XD of the drill 100.

FIG. 3 illustrates a radius of curvature R of the first curvilinear cutting edge 136 and this radius of curvature R may generally be between about 8% to 20% of the external diameter XD of drill 100. As previously mentioned and with respect to FIG. 4, the chisel edge 141 is curved to blend with the first curvilinear cutting edge portion 136 of both the first tool half 103 and the second tool half 104. As a result, the chisel edge 141 and the adjacent first curvilinear cutting edge portions 136 assume an "s" shape. This "s" shape, along with the positive axial rake angle X of the first curvilinear cutting edge portion 136 provides an enhanced ability to center the cutting tool 100 and also provides additional stability to the cutting tool 100.

As previously discussed, the drill 100 has a chisel edge 141 with first curvilinear cutting edge portions 136 that form a positive rake angle X with the longitudinal axis A-A of the drill 100. It is also possible to produce such a cutting tool without the chisel edge having a positive rake surface but with the chisel edge 141 smoothly blended with the first curvilinear edge portion 136 to produce a smooth "s" shape.

In drilling CFRP-Titanium, the drill 100 described herein produced holes having burrs of generally less than 50% of known drills while lasting approximately twice as long as known drills.

Figure 7:
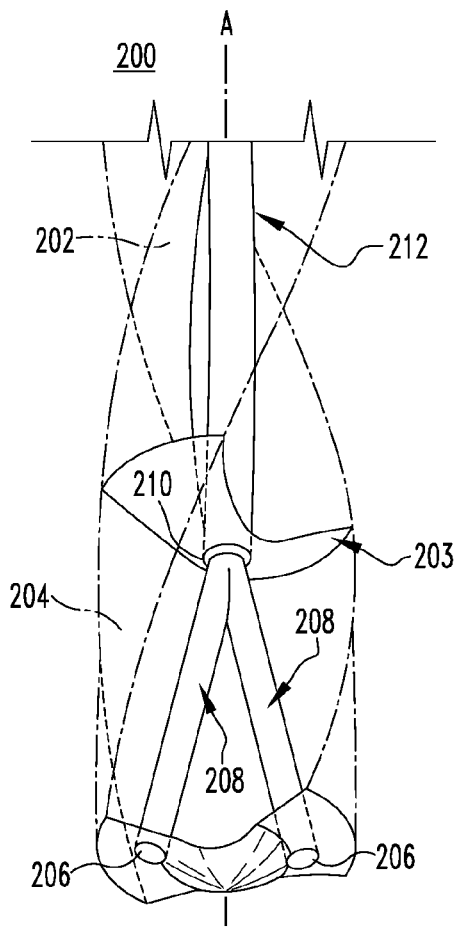
FIG. 7 shows a semi-transparent view of a prior art drill showing the internal coolant passages.
Figure 8:
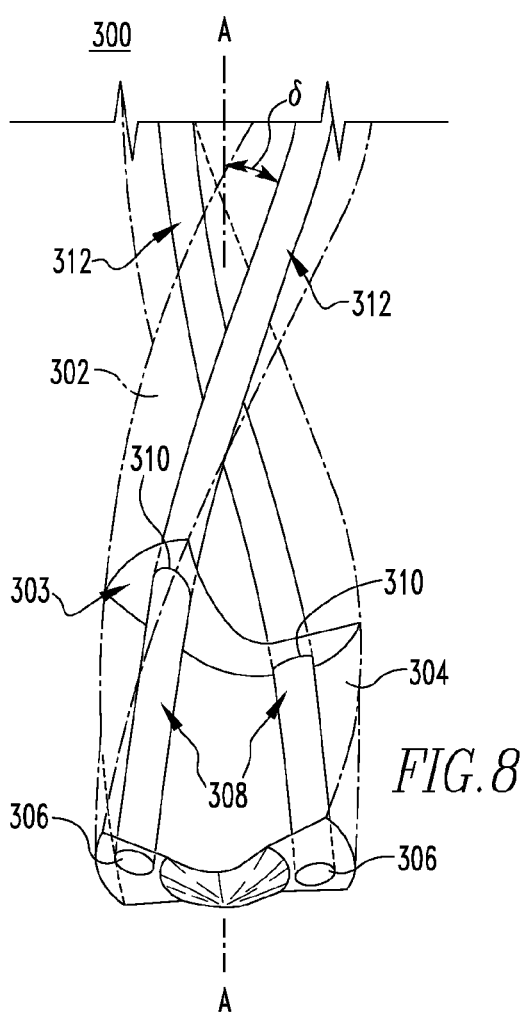
FIG. 8 shows a semi-transparent view of a drill in accordance with a non-limiting embodiment of the present invention showing the internal coolant passages.
Figure 9:
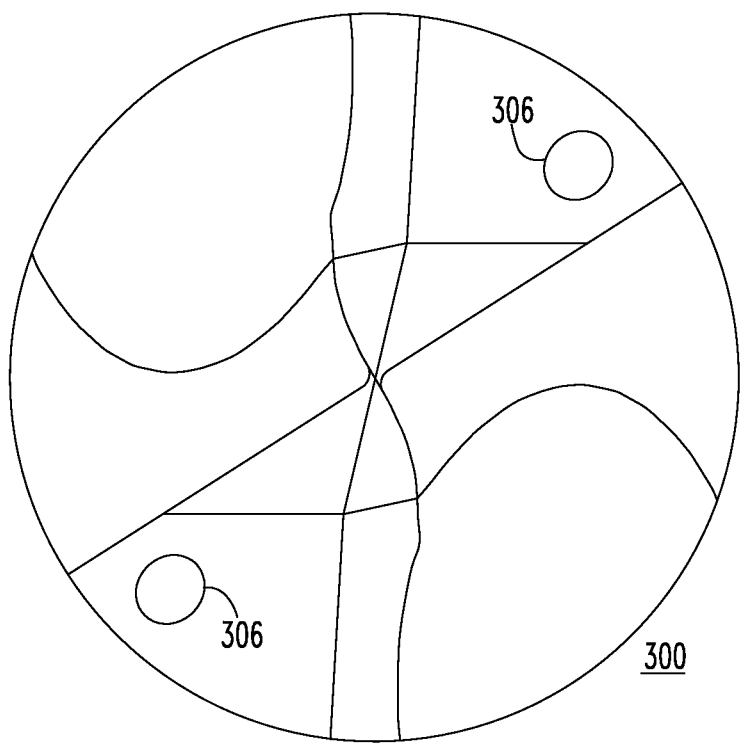
FIG. 9 is a top view of the cutting end of the drill shown in FIG. 8.

Referring to FIGS. 8 and 9, another feature of the present invention is shown in contrast to an example of the prior art shown in FIG. 7. Referring to FIG. 7, an example prior art drill 200 having a carbide body 202 with a brazed tip portion 204 is shown. Coolant is provided to a pair of openings 206 in the brazed tip portion 204 by a pair of straight passageways 208 provided in brazed tip portion 204 that extend from a single opening 210 in the braze joint 203 to each of openings 206. Opening 210 is disposed at the end of a single central coolant passage 212 that travels axially along the central axis A-A of the drill 200.

In contrast to the prior art design shown in FIG. 7, FIGS. 8 and 9 show a drill 300 having a coolant delivery system in accordance with a non-limiting embodiment of the present invention. Similar to the prior art layout, drill 300 includes a carbide body 302 having a brazed tip portion 304. Coolant is provided to a pair of openings 306 in the brazed tip portion 304 by a pair of straight passageways 308 provided in brazed tip portion 304 that extend from a pair of openings 310 in the braze joint 303 such that each passageway 308 is disposed between a respective one of openings 306 and a respective one of openings 310. Each of openings 310 is disposed at the end of a respective spiral shaped coolant passage 312 that travels in a generally spiral-like manner about the central axis A-A of the drill 300 along a helix angle δ relative to the central axis A-A.

Passages 312 are formed when the carbide rods are initially extruded. The helix angle δ of the passages 312 is generally controlled by the required helix angle on the flute (i.e., the lead (or pitch) of the coolant hole is typically the same as the desired lead to get the necessary flute helix angle). In some cases there are allowed deviations, as long as the coolant does not intersect the path of the flute profile. Typically the coolant hole is placed generally between 30-80% of the drill radius in the radial direction, and circumferentially about 25 to 60 degrees from the edge of the cutting corner.

Passageways 308 are typically formed in tip portion 304 prior to brazing onto carbide body 302. Such passageways 308 may be formed via EDM hole drilling or other suitable processes. The passageways 308 are preferably aligned at an angle to meet the existing coolant holes in the rod tangentially, however, the passageways 308 could also meet at other angles (e.g., without limitation, could be parallel to the axis of the drill).

In such new design, as shown in FIGS. 8 and 9, strength and rigidity is not compromised significantly, unlike the example of FIG. 7 where a single central coolant passage 212 is utilized. Unlike the prior art there is no danger of a "weak" intersection at the load bearing areas near the core. The multi coolant passage design of the present invention allows for more coolant volume to be brought to the cutting edge. The multi coolant passage design also presents no limitations for smaller diameter drills. Furthermore, the multi coolant passage design generally does not increase manufacturing costs as two holes need to be made through the PCD material either way.

Although described herein in conjunction with a PCD tipped drill, it is to be appreciated that the multi coolant passage design could also readily be applied to other applications that involve brazing a tip portion to an existing rod. Rod materials used in such applications may commonly include, for example, without limitation, carbide, ceramic, powdered metal, high speed steel, steel, and others. Tip materials used in such applications may include, for example, without limitation, carbide, cermet, ceramic, PCD, pCBN and others.

Drills constructed in accordance with the present invention can be used in many applications throughout all industries but are particularly well suited for use in hole cutting operations involving composite materials (e.g., without limitation, CFRP-Titanium composites).

Other applications, embodiments and variations to the disclosed embodiments described herein will be apparent to those skilled in the art and may be made without departing from the spirit and scope of the invention as defined in the appended claims.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A rotary cutting tool comprising: an elongate body disposed about a longitudinal axis, the elongate body including a helical flute and a polycrystalline diamond cutting tip having an external radial circumference; the cutting tip comprising: an inner portion comprising: a pair of first cutting edge portions, wherein each first cutting edge portion extends radially away from a central portion of the cutting tip; each of the first cutting edge portions being substantially straight along its entire length when viewed in longitudinal cross-section; wherein an inner point angle is defined between the first cutting edge portions; an outer portion comprising: a pair of second cutting edge portions, wherein each second cutting edge portion extends directly from a corresponding first cutting edge portion toward the external radial circumference; each of the second cutting edge portions being substantially straight along its entire length when viewed in longitudinal cross-section; wherein an outer point angle is defined between the second cutting edge portions, the outer point angle being greater than the inner point angle; and an outer margin on the external radial circumference; wherein the inner point angle is in the range of about 110 degrees to about 140 degrees; and wherein the outer point angle is in the range of more than 150 degrees to less than 180 degrees.

2. The rotary cutting tool of claim 1 wherein the elongate body is formed from a carbide material.

3. The rotary cutting tool of claim 1 wherein the elongate body comprises:
   a first end opposite the cutting tip; and
   at least two coolant passages passing therethrough, each coolant passage extending from the first end to the cutting tip.

4. The rotary cutting tool of claim 3 wherein each coolant passage is generally helical in shape.

5. The rotary cutting tool of claim 3, comprising at least two coolant passages passing through the cutting tip.

6. The rotary cutting tool of claim 5, wherein the at least two coolant passages are straight.

7. The rotary cutting tool of claim 6, wherein the at least two coolant passages are oriented at a non-zero angle with respect to the longitudinal axis of the elongate body.

8. The rotary cutting tool of claim 1 wherein the first cutting edge portions comprise curvilinear cutting edge portions having adjacent surfaces which are disposed at a positive rake angle and wherein the positive axial rake angle is in the range of 0 to about 15 degrees.

9. The rotary cutting tool of claim 8 wherein the positive axial rake angle is about 5 degrees.

10. The rotary cutting tool of claim 1 wherein the inner point angle is defined by the first cutting edge portions extending generally radially outward from a chisel edge, each of the first cutting edge portions having an adjacent surface which defines a positive axial rake angle.

11. The rotary cutting tool of claim 1, wherein the cutting tip further comprises a chisel edge having a length of about 1% to about 10% of an external diameter of the rotary cutting tool.

12. The rotary cutting tool of claim 1, wherein the cutting tip further comprises cutting edges having a top flank, the top flank including forward surface sections and rearward surface sections on opposing sides of the rotary cutting tool, the forward sections oriented at a first relief angle between 5 degrees and 20 degrees and the rearward surface sections oriented at a second relief angle between 15 degrees and 50 degrees.

13. The rotary cutting tool of claim 12, wherein, when viewed with respect to a horizontal plane, the first cutting edge portion has a radius of curvature ranging from 8% to 20% of an external diameter of the rotary cutting tool.

14. The rotary cutting tool of claim 12, wherein the first cutting edge portion does not extend to the cutting tip center.

15. The rotary cutting tool of claim 1, wherein the cutting tip is coupled to the elongate body at least partly via brazing.

16. The rotary cutting tool of claim 15, wherein:
   the elongate body comprises:
      a main portion; and
      an end portion extending from the main portion;
   the cutting tip is coupled to the end portion of the elongate body via sintering; and
   the end portion of the elongate body is brazed onto the main portion of the elongate body.

17. A polycrystalline-diamond cutting tip for use with a rotary cutting tool, the cutting tip comprising: a chisel edge having a length about 1% to 10% of an external diameter of the cutting tip; an inner portion comprising: a pair of first cutting edge portions, wherein each first cutting edge portion extends radially away from a central portion of the cutting tip; each of the first cutting edge portions being substantially straight along its entire length when viewed in longitudinal cross-section; wherein an inner point angle is defined between the first cutting edge portions; and an outer portion comprising: a pair of second cutting edge portions, wherein each second cutting edge portion extends directly from a corresponding first cutting edge portion toward the external radial circumference; each of the second cutting edge portions being substantially straight along its entire length when viewed in longitudinal cross-section; wherein an outer point angle is defined between the second cutting edge portions, the outer point angle being greater than the inner point angle; and a top flank which includes a flank edge oriented at an angle ranging from 75 degrees to 105 degrees with respect to the chisel edge; wherein the inner point angle is in the range of about 110 degrees to about 140 degrees; and wherein the outer point angle is in the range of more than 150 degrees to less than 180 degrees.

18. The cutting tip of claim 17 wherein the first cutting edge portions comprise curvilinear cutting edge portions having adjacent surfaces which are disposed at a positive rake angle and wherein the positive axial angle is in the range of 0 to about 15 degrees.

19. The cutting tip of claim 17 wherein the inner point angle is defined by the first cutting edge portions extending generally radially outward from the chisel edge, each of the first cutting edge portions having an adjacent surface which defines a positive axial rake angle.

20. The cutting tip of claim 17, wherein the top flank includes forward surface sections and rearward surface sections on opposing sides of the rotary cutting tool, the forward sections oriented at a first relief angle between 5 degrees and 20 degrees and the rearward surface sections oriented at a second relief angle between 15 degrees and 50 degrees.

21. The cutting tip of claim 20, wherein, when viewed with respect to a horizontal plane, the first cutting edge portion has a radius of curvature ranging from 8% to 20% of an external diameter of the rotary cutting tool.

22. The cutting tip of claim 20, wherein the first cutting edge portion does not extend to the cutting tip center.

23. A rotary cutting tool comprising: an elongate body disposed about a longitudinal axis, the elongate body including a helical flute and a polycrystalline diamond cutting tip; the cutting tip comprising: a chisel edge having a length about 1% to 10% of an external diameter of the cutting tip; an inner portion comprising: a pair of first cutting edge portions, wherein each first cutting edge portion extends radially away from a central portion of the cutting tip; each of the first cutting edge portions being substantially straight along its entire length when viewed in longitudinal cross-section; wherein an inner point angle is defined between the first cutting edge portions; and an outer portion comprising: a pair of second cutting edge portions, wherein each second cutting edge portion extends directly from a corresponding first cutting edge portion toward the external radial circumference; each of the second cutting edge portions being substantially straight along its entire length when viewed in longitudinal cross-section; wherein an outer point angle is defined between the second cutting edge portions, the outer point angle being greater than the inner point angle; and a top flank which includes a flank edge oriented at an angle ranging from 75 degrees to 105 degrees with respect to the chisel edge; wherein the inner point angle is in the range of about 110 degrees to about 140 degrees; and wherein the outer point angle is in the range of more than 150 degrees to less than 180 degrees.

24. The rotary cutting tool of claim 23, wherein the top flank includes forward surface sections and rearward surface sections on opposing sides of the rotary cutting tool, the forward sections oriented at a first relief angle between 5 degrees and 20 degrees and the rearward surface sections oriented at a second relief angle between 15 degrees and 50 degrees.

25. The rotary cutting tool of claim 24, wherein, when viewed with respect to a horizontal plane, the first cutting edge portion has a radius of curvature ranging from 8% to 20% of an external diameter of the rotary cutting tool.

26. The rotary cutting tool of claim 24, wherein the first cutting edge portion does not extend to the cutting tip center.

27. The rotary cutting tool of claim 24, wherein the cutting tip further comprises an outer margin on an external radial circumference of the rotary cutting tool.

28. The rotary cutting tool of claim 23, wherein:
   the top flank includes forward surface sections and rearward surface sections on opposing sides of the rotary cutting tool;
   the rearward surface sections comprising an edge which is coincident with the flank edge;
   the flank edge being oriented at an angle ranging from 85 degrees to 95 degrees with respect to the chisel edge.

* * * * *